A. O. JACKSON.
BED PAN.
APPLICATION FILED FEB. 15, 1909.

953,954.

Patented Apr. 5, 1910.

Witnesses:

Inventor:
Amanda O. Jackson.

UNITED STATES PATENT OFFICE.

AMANDA ORR JACKSON, OF ST. LOUIS, MISSOURI.

BED-PAN.

953,954.  Specification of Letters Patent.  Patented Apr. 5, 1910.

Application filed February 15, 1909. Serial No. 478,015.

*To all whom it may concern:*

Be it known that I, AMANDA ORR JACKSON, a citizen of the United States, residing at city of St. Louis, State of Missouri, have invented a new, original, and useful Bed-Pan, of which the following is a specification, reference being had to the accompanying drawing, forming a part hereof.

My invention relates to improvements in bed pans in which by a combination of a horse-shoe rest on the underside of the bottom of the pan, and an incline and leg at the front and bottom of the pan, and a flange or flat rim at the top of the pan, I have a bed pan that is comfortable to the user, and requires no neck or extension to pass under the body of the user, and will not slip out of place when in use.

Figure 1:
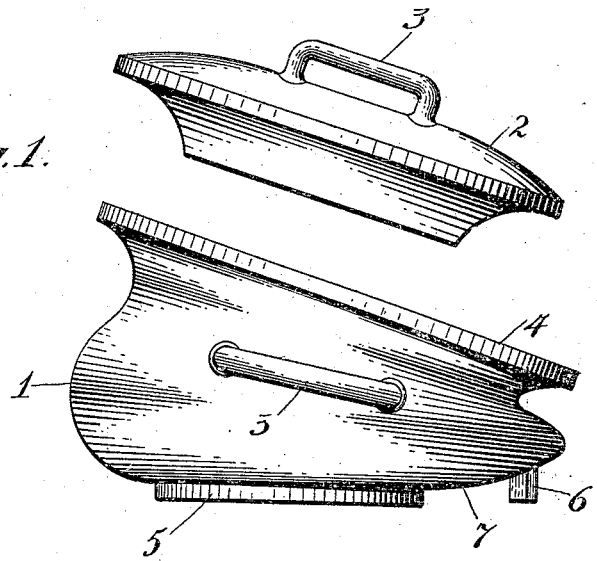
Figure 2:
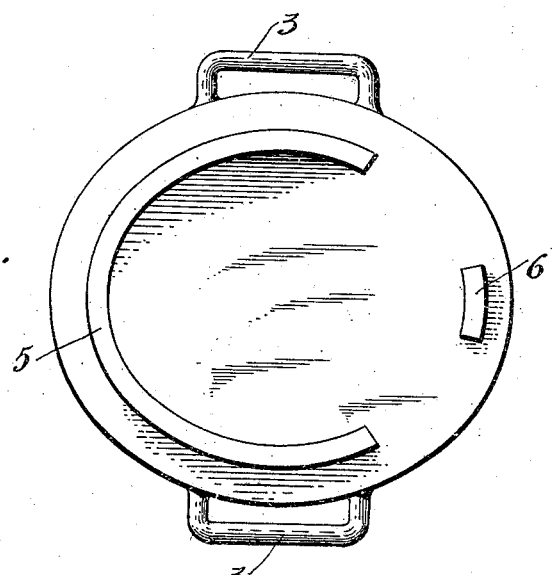

In the drawing, Figure 1 is a side elevation of the bed pan and cover, the cover being slightly removed from its seat. Fig. 2 is a bottom view of the pan.

The leading features of my invention may be described as follows.

1 represents a suitable oval bowl or bed pan having an incline at one end of the bowl or bed pan.

2 is an oval lid to fit the bowl or bed pan.

3 are round handles on top of the lid and at the sides of the bowl, by which it may be carried.

4 is flat rim at the top of the oval bowl or bed pan on which the body rests when the pan is in use, and on which the lid rests when the pan is not in use.

5 is a rest in the shape of a horse shoe at the under side of the bottom of the bowl or bed pan, upon which the pan rests when not in use.

6 is a small leg at the end of the bowl or bed pan which is pressed down into the bedding when the pan is in use, thus preventing pan from slipping out of place.

7 is a slope or inclined plane in the bottom of the pan 1 slanting upward from the horse shoe shaped rest 5 at about fifteen degrees, which when the pan is in use is thrown into a horizontal position by the weight of the body, thus in conjunction with the flat rim 4 forming a comfortable rest for the body of the user.

The novelties of my invention are: the flat rim 4 at the top of the bowl, the horse shoe shaped rest 5 on the under surface of the bed pan, the small leg 6 at the inclined end of the bowl or bed pan, and the inclined plane or surface 7 at the end of the bottom of the bed pan.

Having thus described my invention what I claim is:

The combination in a bed pan, of a flat rim at the top thereof, a bottom the rear one-third of which inclines upward at an angle of about fifteen degrees, a horse shoe shaped rest on the under surface of the bottom, and a short leg at substantially the upper end of said inclined portion.

Witness my hand this ninth day of February, 1909.

AMANDA ORR JACKSON.

Witnesses:
　ALBERT E. HAUSMAN,
　LUTHER STEPHENS.